(12) United States Patent
Xu

(10) Patent No.: US 9,235,070 B2
(45) Date of Patent: Jan. 12, 2016

(54) VOLTAGE-APPLYING CIRCUIT FOR LC PHOTO-ALIGNMENT AND LC PHOTO-ALIGNMENT PANEL

(71) Applicant: SHENZHEN CHINA STAR OPTOELECTRONICS TECHNOLOGY CO., LTD., Shenzhen, Guangdong (CN)

(72) Inventor: Zhengxing Xu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 569 days.

(21) Appl. No.: 13/808,098

(22) PCT Filed: Oct. 26, 2012

(86) PCT No.: PCT/CN2012/083547
§ 371 (c)(1),
(2) Date: Jan. 3, 2013

(87) PCT Pub. No.: WO2014/029166
PCT Pub. Date: Feb. 27, 2014

(65) Prior Publication Data
US 2014/0232965 A1      Aug. 21, 2014

(30) Foreign Application Priority Data

Aug. 23, 2012 (CN) .......................... 2012 1 0302716

(51) Int. Cl.
*G02F 1/1337* (2006.01)
*G02F 1/133* (2006.01)
*G02F 1/13* (2006.01)
*G02F 1/1362* (2006.01)

(52) U.S. Cl.
CPC .......... *G02F 1/13306* (2013.01); *G02F 1/1309* (2013.01); *G02F 1/133788* (2013.01); *G02F 1/136259* (2013.01)

(58) Field of Classification Search
CPC ..................... G02F 1/136259; G02F 1/1309
See application file for complete search history.

(56) References Cited

U.S. PATENT DOCUMENTS

2013/0088679 A1 * 4/2013 Lu .......................... G09G 3/006
                                                         349/139

FOREIGN PATENT DOCUMENTS

CN           1439921 A       9/2003
CN         101109855 A       1/2008

OTHER PUBLICATIONS

1st Office Action of counterpart Chinese Patent Application No. 201210302716.8 issued on Jun. 23, 2014.

*Primary Examiner* — Phu Vu

(57) ABSTRACT

The A voltage-applying circuit for LC photo-alignment, comprising: a plurality of liquid crystal panels each of which comprises G_Odd, a G_Even, a R, a B, a G, a CF_Com, and a TFT_Com signal input terminals; a plurality of voltage-applying point groups connected to the liquid crystal panels, each voltage-applying point group comprising G_Odd, a G_Even, a R, a G, a B, a CF_Com, and a TFT_Com voltage-applying points respectively connected to the G_Odd, G_Even, R, G, B, CF_Com, and TFT_Com signal input terminals of the corresponding liquid crystal panel; a voltage supplying module comprising a plurality of power sources each of which is connected to the voltage-applying points of the voltage-applying point groups having the same function; and a plurality of switch control circuits each of which is connected between each liquid crystal panel and the voltage-applying point group.

15 Claims, 2 Drawing Sheets

VOLTAGE-APPLYING CIRCUIT FOR LC PHOTO-ALIGNMENT AND LC PHOTO-ALIGNMENT PANEL

BACKGROUND

1. Technical Field

The present disclosure relates to LCD technology and, particularly, to a voltage-applying circuit for LC photo-alignment and a LC photo-alignment panel.

2. Description of Related Art

LC photo-alignment technology refers to exposing a LCD panel to ultraviolet when a voltage is being applied to the LCD panel, so as to cause the monomer of the LCD to react and allow a liquid crystal molecule to form a pre-tilt angle. In this way, the purpose of aligning the liquid crystal of the LCD panel is achieved. The LCD panel includes a CF (Color Filter) substrate, a liquid crystal layer, and a TFT (Thin Film Transistor) substrate. The CF substrate and the TFT substrate are respectively provided with an ITO transparent electrode layer, and the surface of the ITO transparent electrode layer is provided with a polyimide alignment film. The liquid crystal layer between the CF substrate and the TFT substrate contains a number of monomers. When applying a voltage to the CF substrate and the TFT substrate and exposing the CF substrate and the TFT substrate to ultraviolet, the monomers of the liquid crystal layer will react to allow the liquid crystal molecules to arrange in a predetermined inclination angle, so as to achieve the purpose of the liquid crystal alignment. Currently, the LC photo-alignment technology has been widely applied to the TFT-LCD industry.

Currently, a LC photo-alignment panel includes a number of liquid crystal panels and a number of voltage-applying point groups. Each liquid crystal panel corresponds to a voltage-applying point group. Each voltage-applying point group includes a G_Odd (odd electrodes of the Gate) voltage-applying point, a G_Even (even electrodes of the Gate) voltage-applying point, a R (Source of a red pixel) voltage-applying point, a G (Source of a green pixel) voltage-applying point, a B (Source of a blue pixel) voltage-applying point, a CF_Com (common electrode of the color filter substrate) voltage-applying point, and a TFT_Com (common electrode of the thin film transistor substrate) voltage-applying point. The G_Odd, G_Even, R, G, B, CF_Com, and TFT_Com voltage-applying points of each voltage-applying point group are respectively connected to the G_Odd, G_Even, R, G, B, CF_Com, and TFT_Com signal input terminals of the liquid crystal panel.

Currently, when carrying out photo-alignment to the liquid crystal molecules of the liquid crystal panel, in order to save power, voltage-applying points having the same function of the voltage-applying point groups in the same LC photo-alignment panel are connected to the same power supply (powered by the same power supply). However, when one of the liquid crystal panels cannot work properly and cause a short circuit between the CF_Com voltage-applying point and the R voltage-applying point (or G voltage-applying point, or B voltage-applying point), an abnormal current will be input into the CF_Com signal input terminal of the liquid crystal panel, resulting in an abnormal photo-alignment of the corresponding liquid crystal panel. As described above, voltage-applying points having the same function of the voltage-applying point groups in the same LC photo-alignment panel are connected with the same power supply, therefore, the CF_Com voltage-applying points of the voltage-applying point groups share a common power supply, that is, the CF_Com voltage-applying point of each voltage-applying point group sequentially are connected together in sequence to form a CF_Com voltage-applying bus. The CF_Com voltage-applying bus is connected to the CF_Com signal input terminal of each liquid crystal panel. In this way, when an abnormal current occurs in the CF_Com signal input terminal of one of the liquid crystal panels, other CF_Com signal input terminals of other liquid crystal panels on the LC photo-alignment panel also have abnormal currents, resulting in abnormal photo-alignments of the other liquid crystal panels on the LC photo-alignment panel.

SUMMARY

Main purpose of the present disclosure is to provide a voltage-applying circuit for LC photo-alignment which is capable of avoiding the situation where an abnormal current in a CF_Com signal input terminal of a single liquid crystal panel on a LC photo-alignment panel results in abnormal photo-alignments of the other liquid crystal panels on the LC photo-alignment panel.

The present disclosure provides a voltage-applying circuit for LC photo-alignment, including:

a number of liquid crystal panels each of which includes G_Odd, G_Even, R, G, B, CF_Com, and TFT_Com signal input terminals;

a number of voltage-applying point groups connected to the liquid crystal panels, each voltage-applying point group including G_Odd, G_Even, R, G, B, CF_Com, and TFT_Com voltage-applying points respectively connected to the G_Odd, G_Even, R, G, B, CF_Com, and TFT_Com signal input terminals of the corresponding liquid crystal panel;

a voltage supplying module including a number of power sources each of which is connected to the voltage-applying points of the voltage-applying point groups having the same function; and a number of switch control circuits each of which is connected between each liquid crystal panel and the voltage-applying point group and is configured for disconnecting the G_Odd, G_Even, R, G, and B signal input terminals of the liquid crystal panel from the G_Odd, G_Even, R, G, and B voltage-applying points of the voltage-applying point group respectively when a current of the CF_Com signal input terminal of one of the liquid crystal panels becomes abnormal.

Preferably, the switch control circuit includes:

an ESD protecting circuit for detecting a feedback current from the CF_Com signal input terminal of the liquid crystal panel; and a switch circuit for disconnecting the G_Odd, G_Even, R, G, and B signal input terminals of the liquid crystal panel from the G_Odd, G_Even, R, G, and B voltage-applying points respectively when the feedback current is greater than a breakdown current of the ESD protecting circuit.

Preferably, the switch circuit includes a first switch, a second switch, a third switch, a fourth switch, and a fifth switch;

one end of the first switch is connected to the G_Odd voltage-applying point, and the other end of the first switch is connected to the G_Odd signal input terminal;

one end of the second switch is connected to the G_Even voltage-applying point, and the other end of the second switch is connected to the G_Even signal input terminal;

one end of the third switch is connected to the R voltage-applying point, and the other end of the third switch is connected to the R signal input terminal;

one end of the fourth switch is connected to the G voltage-applying point, and the other end of the fourth switch is connected to the G signal input terminal;

one end of the fifth switch is connected to the B voltage-applying point, and the other end of the fifth switch is connected to the B signal input terminal; and control ends of the first switch, the second switch, the third switch, the fourth switch, and the fifth switch are all connected to the ESD protecting circuit.

Preferably, the first switch, the second switch, the third the switch, the fourth switch, and the fifth switch are all TFTs, a source of each TFT is connected to corresponding power source of the voltage-applying point group, a drain of each TFT is connected to the corresponding signal input terminal of the liquid crystal panel, and a gate of each TFT is connected to the ESD protecting circuit.

Preferably, the ESD protecting circuitry is a dual-diode which includes a first diode and a second diode, a cathode of the first diode is connected to that of the second diode, an anode of the first diode is connected to the CF_Com signal input terminal of the liquid crystal panel, and the anode of the second diode is connected to the gate of each TFT.

The present disclosure further provides a LC photo-alignment panel, including a voltage-applying circuit for LC photo-alignment, the voltage-applying circuit including:

a number of liquid crystal panels arranged on the LC photo-alignment panel, each liquid crystal panel including G_Odd, G_Even, R, G, B, CF_Com, and TFT_Com signal input terminals;

a number of voltage-applying point groups connected to the liquid crystal panels, each voltage-applying point group including G_Odd, G_Even, R, G, B, CF_Com, and TFT_Com voltage-applying points respectively connected to the G_Odd, G_Even, R, G, B, CF_Com, and TFT_Com signal input terminals of the corresponding liquid crystal panel;

a voltage supplying module arranged outside the LC photo-alignment panel and including a number of power sources each of which is connected to the voltage-applying points of the voltage-applying point groups having the same function; and a number of switch control circuits arranged on the LC photo-alignment panel, each switch control circuit being connected between each liquid crystal panel and the corresponding voltage-applying point group and being configured for disconnecting the G_Odd, G_Even, R, G, and B signal input terminals of the liquid crystal panel from the G_Odd, G_Even, R, G, and B voltage-applying points of the voltage-applying point group respectively when a current of the CF_Com signal input terminal of one of the liquid crystal panels becomes abnormal.

Preferably, the switch control circuit includes:

an ESD protecting circuit for detecting a feedback current from the CF_Com signal input terminal of the liquid crystal panel; and a switch circuit for disconnecting the G_Odd, G_Even, R, G, and B signal input terminals of the liquid crystal panel from the G_Odd, G_Even, R, G, and B voltage-applying points respectively when the feedback current is greater than a breakdown current of the ESD protecting circuit.

Preferably, the switch circuit includes a first switch, a second switch, a third switch, a fourth switch, and a fifth switch;

one end of the first switch is connected to the G_Odd voltage-applying point, and the other end of the first switch is connected to the G_Odd signal input terminal;

one end of the second switch is connected to the G_Even voltage-applying point, and the other end of the second switch is connected to the G_Even signal input terminal;

one end of the third switch is connected to the R voltage-applying point, and the other end of the third switch is connected to the R signal input terminal;

one end of the fourth switch is connected to the G voltage-applying point, and the other end of the fourth switch is connected to the G signal input terminal;

one end of the fifth switch is connected to the B voltage-applying point, and the other end of the fifth switch is connected to the B signal input terminal; and control ends of the first switch, the second switch, the third switch, the fourth switch, and the fifth switch are all connected to the ESD protecting circuit.

Preferably, the first switch, the second switch, the third switch, the fourth switch, and the fifth switch are TFT, a source of each TFT is connected to the corresponding power source of the voltage-applying point group, a drain of each TFT is connected to the corresponding signal input terminal of the liquid crystal panel, and a gate of each TFT is connected to the ESD protecting circuit.

Preferably, the ESD protecting circuit is a dual-diode that includes a first diode and a second diode, a cathode of the first diode is connected to that of the second diode, an anode of the first diode is connected to the CF_Com signal input terminal of the liquid crystal panel, and the anode of the second diode is connected to the gate of each TFT.

The present disclosure further yet provides another LC photo-alignment panel, including a voltage-applying circuit for LC photo-alignment, the voltage-applying circuit including:

a number of liquid crystal panels each of which includes G_Odd, G_Even, R, G, B, CF_Com, and TFT_Com signal input terminals;

a number of voltage-applying point groups connected to the liquid crystal panels, each voltage-applying point group including G_Odd, G_Even, R, G, B, CF_Com, and TFT_Com voltage-applying points respectively connected to the G_Odd, G_Even, R, G, B, CF_Com, and TFT_Com signal input terminals of the corresponding liquid crystal panel;

a voltage supplying module including a number of power sources each of which is connected to voltage-applying points of the voltage-applying point groups having the same function; and a number of switch control circuits each of which is connected between the liquid crystal panel and the voltage-applying point group and being configured for disconnecting the signal input terminals of G_Odd, G_Even, R, G, and B of the liquid crystal panel from the voltage-applying points of G_Odd, G_Even, R, G, and B of the voltage-applying point group when current of the CF_Com signal input terminal of a liquid crystal panel becomes abnormal.

Preferably, the switch control circuit includes:

an ESD protecting circuit for detecting a feedback current from the CF_Com signal input terminal of the liquid crystal panel; and a switch circuit for disconnecting the G_Odd, G_Even, R, G, and B signal input terminals of the liquid crystal panel from the G_Odd, G_Even, R, G, and B voltage-applying points respectively when the feedback current is greater than a breakdown current of the ESD protecting circuit.

Preferably, the switch circuit includes a first switch, a second switch, a third switch, a fourth switch, and a fifth switch;

one end of the first switch is connected to the G_Odd voltage-applying point, and the other end of the first switch is connected to the G_Odd signal input terminal;

one end of the second switch is connected to the G_Even voltage-applying point, and the other end of the second switch is connected to the G_Even signal input terminal;

one end of the third switch is connected to the R voltage-applying point, and the other end of the third switch is connected to the R signal input terminal;

one end of the fourth switch is connected to the G voltage-applying point, and the other end of the fourth switch is connected to the G signal input terminal;

one end of the fifth switch is connected to the B voltage-applying point, and the other end of the fifth switch is connected to the B signal input terminal; and control ends of the first switch, the second switch, the third switch, the fourth switch, and the fifth switch are all connected to the ESD protecting circuit.

Preferably, the first switch, the second switch, the third switch, the fourth switch, and the fifth switch are all TFTs, a source of each TFT are respectively connected to the corresponding power source of the voltage-applying point group, a drain each TFT is connected to the corresponding signal input terminal of the liquid crystal panel, and a gate of each TFT is connected to the ESD protecting circuit.

Preferably, the ESD protecting circuit is a dual-diode that includes a first diode and a second diode, a cathode of the first diode is connected to that of the second diode, an anode of the first diode is connected to the CF_Com signal input terminal of the liquid crystal panel, and the anode of the second diode is connected to the gate of each TFT.

In the voltage-applying circuit for LC photo-alignment provided in the present disclosure, with the switch control circuit being connected between each voltage-applying point group and the corresponding liquid crystal panel, when the current of the CF_Com signal input terminal of a liquid crystal panel becomes abnormal, the switch control circuit disconnects the G_Odd, G_Even, R, G, and B signal input terminals of the liquid crystal panel from the G_Odd, G_Even, R, G, and B voltage-applying points of the voltage-applying point group respectively, namely, the disconnections the G_Odd, G_Even, R, G, and B signal input terminals of the liquid crystal panel and the corresponding power sources of the voltage supplying module are respectively disconnected, thereby avoiding the situation where the abnormal current in the CF_Com signal input terminal of a liquid crystal panel leads to the abnormal currents in the CF_Com signal input terminals of the other liquid crystal panels and realizing the normal photo-alignment process of the other liquid crystal panels on the LC photo-alignment panel.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
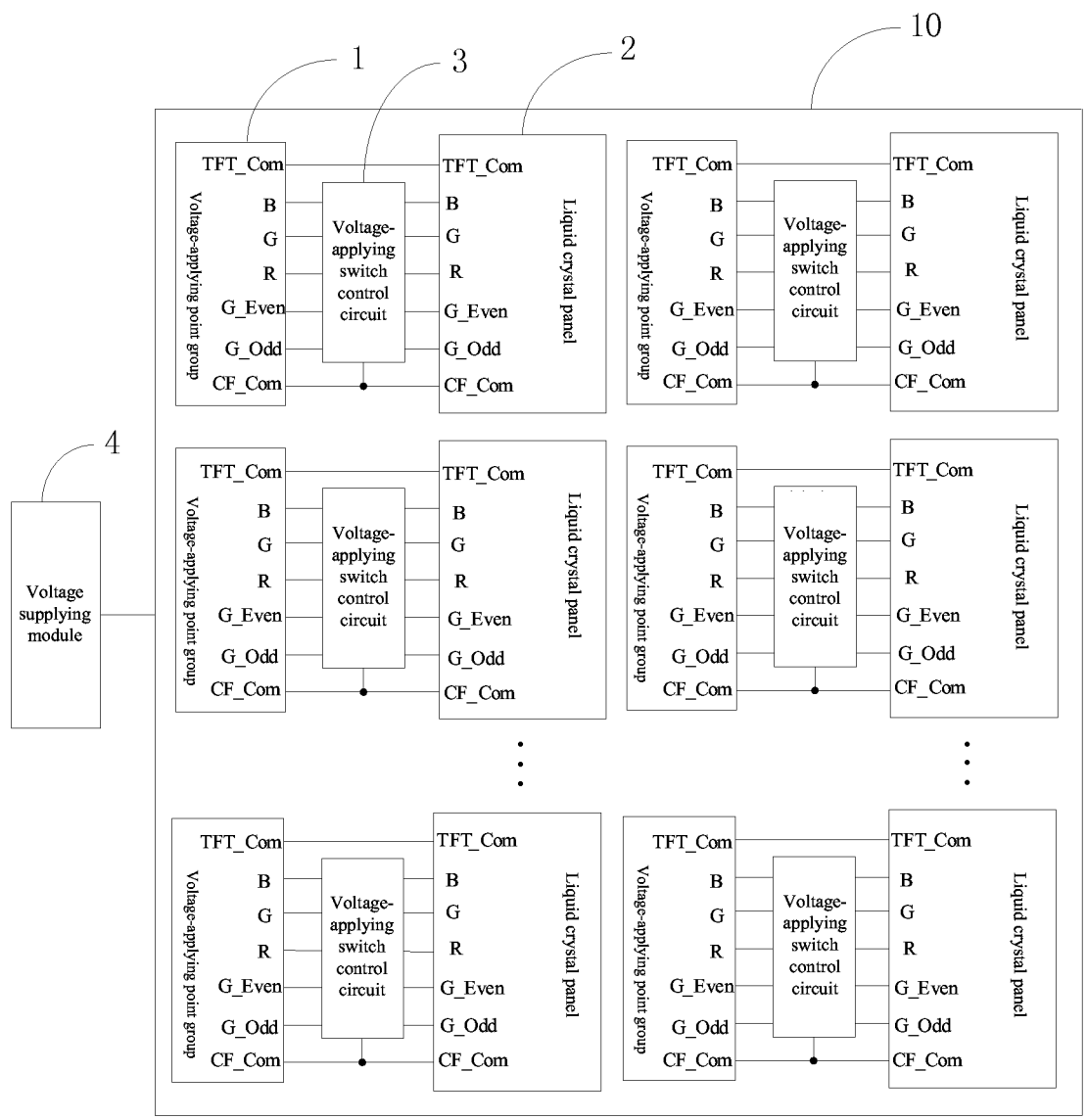
FIG. 1 is a schematic circuit diagram of a voltage-applying circuit for LC photo-alignment, according to an embodiment of the present disclosure.

FIG. 1 is a schematic circuit diagram of a voltage-applying circuit for LC photo-alignment, according to an embodiment of the present disclosure.

Referring to FIG. 1, a voltage-applying circuit for LC photo-alignment includes a number of liquid crystal panels 2, a number of voltage-applying point groups 1 connected to the liquid crystal panels 2, a number of switch control circuits 3 for switching on or switching off of an applying voltage, and a voltage supplying module 4. The voltage-applying point groups 1, liquid crystal panels 2, control circuits 3 are all arranged on a liquid crystal (LC) photo-alignment panel 10, while the voltage supplying module 4 can be arranged on or outside the LC photo-alignment panel 10. In the present embodiment, the voltage supplying module 4 is arranged outside the LC photo-alignment panel 10.

Specifically, each voltage-applying point group 1 corresponds to a liquid crystal panel 2. Each switch control circuit 3 is connected between a voltage-applying point group 1 and the corresponding liquid crystal panel 2. The voltage supplying module 4 includes a number of power sources. Voltage-applying points of the voltage-applying point groups 1 having the same function are all connected to the same power source of the voltage supplying module 4.

Each voltage-applying point group 1 includes G_Odd, G_Even, R, G, B, CF_Com, and TFT_Com voltage-applying points. Each liquid crystal panel 2 is provided with G_Odd, G_Even, R, G, B, CF_Com, and TFT_Com signal input terminals. The TFT_Com voltage-applying point of each voltage-applying point group 1 is connected to the TFT_Com signal input terminal of the corresponding liquid crystal panel 2. The CF_Com voltage-applying point of each voltage-applying point group 1 is connected to the CF_Com signal input terminal of the corresponding liquid crystal panel 2. The G_Odd, G_Even, R, G, and B voltage-applying points of the voltage-applying point group 1 are respectively connected to the G_Odd, G_Even, R, G, and B signal input terminals of the corresponding liquid crystal panel 2 via the switch control circuit 3. The switch control circuit 3 is also connected to the CF_Com signal input terminal of the corresponding liquid crystal panel 2.

When carrying out the photo-alignment to the liquid crystal molecules of the liquid crystal panel 2, in order to save power, voltage-applying points of the voltage-applying point groups 1 having the same function are all connected to the same power source of the voltage supplying module 4 (powered by the same power supply). Therefore, the CF_Com voltage-applying points of the voltage-applying point groups 1 share a common power source of the voltage supplying module 4. That is, the CF_Com voltage-applying points of the voltage-applying point groups are sequentially connected together to form a CF_Com voltage-applying bus, which is connected to the CF_Com signal input terminal of each liquid crystal panel 2.

In the embodiment, when the current of the CF_Com signal input terminal of one of the liquid crystal panels 2 is abnormal (the abnormal current is usually caused by a short-circuit between the CF_Com signal input terminal and the R signal input terminal, or the G signal input terminal, or B signal input terminal of the liquid crystal panel 2), the switch control circuit 3 disconnects the connections between the G_Odd, G_Even, R, G, and B signal input terminals of the liquid crystal panel 2 and the G_Odd, G_Even, R, G, and B voltage-applying points of the corresponding voltage-applying point group 1 respectively according to the abnormal current in the CF_Com signal input terminal of the liquid crystal panel 2. Namely, the switch control circuit is capable of respectively disconnecting the G_Odd, G_Even, R, G, and B signal input terminals of the liquid crystal panel 2 from the corresponding power sources of the voltage supplying module 4, thereby avoiding the situation where the abnormal current in the CF_Com signal input terminal of a liquid crystal panel 2 leads to abnormal currents in the CF_Com signal input terminals of other liquid crystal panels and realizing the normal photo-alignment process of the other liquid crystal panels.

In the voltage-applying circuit for LC photo-alignment provided in the present disclosure, with the switch control circuit 3 being connected between each voltage-applying point group and the corresponding liquid crystal panel, when the current of the CF_Com signal input terminal of a liquid crystal panel becomes abnormal, the switch control circuit disconnects the G_Odd, G_Even, R, G, and B signal input terminals of the liquid crystal panel from the G_Odd, G_Even, R, G, and B voltage-applying points of the voltage-applying point group respectively, namely, the disconnections between the G_Odd, G_Even, R, G, and B signal input terminals of the liquid crystal panel and the corresponding power sources of the voltage supplying module are respectively disconnected, thereby avoiding the situation where the abnormal current in the CF_Com signal input terminal of a liquid crystal panel leads to the abnormal currents in the CF_Com signal input terminals of the other liquid crystal panels and realizing the normal photo-alignment process of the other liquid crystal panels on the LC photo-alignment panel. That is, the situation where the abnormal current in the CF_Com signal input terminal of a liquid crystal panel results in the abnormal photo-alignments of other liquid crystal panels can be avoided.

Figure 2:
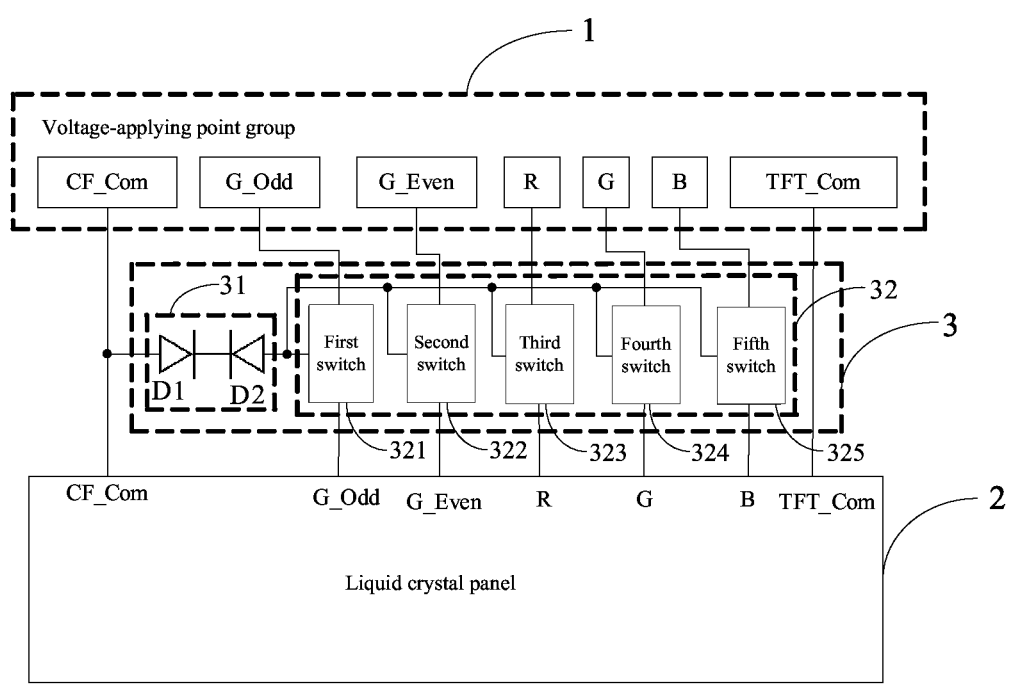
FIG. 2 is a schematic view of a circuit showing the connection between a switch control circuit, a liquid crystal panel, and a voltage-applying point group of the voltage-applying circuit of FIG. 1.

FIG. 2 is a schematic view of a circuit showing the connection between the switch control circuit, the liquid crystal panel, and the voltage-applying point group of the voltage-applying circuit for LC photo-alignment in accordance with an embodiment of the present disclosure. The voltage-applying circuit includes the voltage-applying point group 1, the liquid crystal panel 2, and the switch control circuit 3 connected between the voltage-applying point group 1 and the liquid crystal panel 2. The switch control circuit 3 includes an electro-static discharge (ESD) protecting circuit 31 and a switch circuit 32.

Specifically, one end of the ESD protecting circuit 31 is connected to the CF_Com signal input terminal of the liquid crystal panel 2 and the CF_Com voltage-applying point of each voltage-applying point group 1, and the other end of the ESD protecting circuit 31 is connected to the switch circuit 32.

The switch circuit 32 includes a first switch 321, a second switch 322, a third switch 323, a fourth switch 324, and a fifth switch 325.

One end of the first switch 321 is connected to the G_Odd voltage-applying point of the voltage-applying point group 1, and the other end of the first switch 321 is connected to the G_Odd signal input terminal of a liquid crystal panel 2.

One end of the second switch 322 is connected to the G_Even voltage-applying point of the voltage-applying point group 1, and the other end of the second switch 322 is connected to the G_Even signal input terminal of a liquid crystal panel 2.

One end of the third switch 323 is connected to the R voltage-applying point of the voltage-applying point group 1, and the other end of the third switch 323 is connected to the R signal input terminal of a liquid crystal panel 2.

One end of the fourth switch 324 is connected to the G voltage-applying point of the voltage-applying point group 1, and the other end of the fourth switch 324 is connected to the G signal input terminal of a liquid crystal panel 2.

One end of the fifth switch 325 is connected to the B voltage-applying point of the voltage-applying point group 1, and the other end of the fifth switch 325 is connected to the B signal input terminal of a liquid crystal panel 2.

Control ends of the first switch 321, second switch 322, third switch 323, fourth switch 324, and fifth switch 325 are all connected to the ESD protecting circuit 31.

Additionally, the TFT_Com voltage-applying point of the voltage-applying point group 1 is connected to the TFT_Com signal input terminal of the liquid crystal panel 2.

Specifically, the ESD protecting circuit 31 is used for detecting the feedback current from the CF_Com signal input terminal of the liquid crystal panel 2. The switch circuit 32 is configured for disconnecting the G_Odd, G_Even, R, G, and B signal input terminals of the liquid crystal panel 2 from the G_Odd, G_Even, R, G, and B voltage-applying points of the voltage-applying point group 1 respectively when feedback current from the CF_Com signal input terminal of the liquid crystal panel 2 is greater than the breakdown current of the ESD protecting circuit 31, that is, the connections between the G_Odd, G_Even, R, G, and B signal input terminals of the liquid crystal panel 2 and the corresponding power sources of the voltage supplying module 4 are respectively disconnected.

In the embodiment, the first switch 321, second switch 322, third switch 323, fourth switch 324, and fifth switch 325 are all TFTs (thin film transistors). That is, the switch circuit 32 includes five TFTs. The source of each TFT is connected to the corresponding power source of the voltage-applying point group 1, the drain of each TFT is connected to the corresponding signal input terminals of the liquid crystal panel 2, and the gate of each TFT is connected to the ESD protecting circuit 31.

In the present embodiment, the ESD protecting circuit 31 is a dual-diode, which includes a first diode D1 and a second diode D2. The cathode of the first diode D1 is connected to that of the second diode D2, and the anode of the first diode D1 is connected to the CF_Com signal input terminal of the liquid crystal panel 2. The anode of the second diode D2 is connected to the gates of the TFTs.

In the embodiment, when an abnormality occurs in the liquid crystal panel and causes a short circuit between the CF_Com voltage-applying point and the R voltage-applying point (or G voltage-applying point, or B voltage-applying point), an abnormal current is input into the CF_Com signal input terminal of the liquid crystal panel. When the feedback current from the CF_Com signal input terminal of the liquid crystal panel 2 is greater than the breakdown current of the ESD protecting circuit 31, the dual-diode of the ESD protecting circuit 31 will be disconnected, which shuts down the power in the gates of the TFTs of the switch circuit 32. As a result, the TFTs of the switch circuit 32 are turned off, so that the G_Odd, G_Even, R, G, and B signal input terminals of the liquid crystal panel 2 are disconnected from the G_Odd, G_Even, R, G, and B voltage-applying points of the voltage-applying point group 1 respectively. That is, the connections between the G_Odd, G_Even, R, G, and B signal input terminals of the liquid crystal panel 2 and the corresponding power sources of the voltage supplying module 4 are respectively disconnected. In this way, the situation where the abnormal current in the CF_Com signal input terminal of a liquid crystal panel 2 leads to abnormal currents in the CF_Com signal input terminals of the other liquid crystal panels. Accordingly, the situation where an abnormal current in the CF_Com signal input terminal of a liquid crystal panel 2 results in abnormal photo-alignments of other liquid crystal panels can be avoided.

The present disclosure also provides a LC photo-alignment panel which includes a voltage-applying circuit for LC photo-alignment whose configuration and principle are described above and will not be described again here.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A voltage-applying circuit for LC photo-alignment, comprising:
   a plurality of liquid crystal panels each of which comprises G_Odd, G_Even, R, G, B, CF_Com, and TFT_Com signal input terminals;
   a plurality of voltage-applying point groups connected to the liquid crystal panels, each voltage-applying point group comprising G_Odd, G_Even, R, G, B, CF_Com, and TFT_Com voltage-applying points respectively connected to the G_Odd, G_Even, R, G, B, CF_Com, and TFT_Com signal input terminals of the corresponding liquid crystal panel;
   a voltage supplying module comprising a plurality of power sources each of which is connected to the voltage-applying points of the voltage-applying point groups having the same function; and
   a plurality of switch control circuits each of which is connected between each liquid crystal panel and the voltage-applying point group and is configured for disconnecting the G_Odd, G_Even, R, G, and B signal input terminals of the liquid crystal panel from the G_Odd, G_Even, R, G, and B voltage-applying points of the voltage-applying point group respectively when a current of the CF_Com signal input terminal of one of the liquid crystal panels becomes abnormal.

2. The circuit of claim 1, wherein the switch control circuit comprises:
   an ESD protecting circuit for detecting a feedback current from the CF_Com signal input terminal of the liquid crystal panel; and
   a switch circuit for disconnecting the G_Odd, G_Even, R, G, and B signal input terminals of the liquid crystal panel from the G_Odd, G_Even, R, G, and B voltage-applying points respectively when the feedback current is greater than a breakdown current of the ESD protecting circuit.

3. The circuit of claim 2, wherein the switch circuit comprises a first switch, a second switch, a third switch, a fourth switch, and a fifth switch;
   one end of the first switch is connected to the G_Odd voltage-applying point, and the other end of the first switch is connected to the G_Odd signal input terminal;
   one end of the second switch is connected to the G_Even voltage-applying point, and the other end of the second switch is connected to the G_Even signal input terminal;
   one end of the third switch is connected to the R voltage-applying point, and the other end of the third switch is connected to the R signal input terminal;
   one end of the fourth switch is connected to the G voltage-applying point, and the other end of the fourth switch is connected to the G signal input terminal;
   one end of the fifth switch is connected to the B voltage-applying point, and the other end of the fifth switch is connected to the B signal input terminal; and
   control ends of the first switch, the second switch, the third switch, the fourth switch, and the fifth switch are all connected to the ESD protecting circuit.

4. The circuit of claim 3, wherein the first switch, the second switch, the third the switch, the fourth switch, and the fifth switch are all TFTs, a source of each TFT is connected to corresponding power source of the voltage-applying point group, a drain of each TFT is connected to the corresponding signal input terminal of the liquid crystal panel, and a gate of each TFT is connected to the ESD protecting circuit.

5. The circuit of claim 4, wherein the ESD protecting circuitry is a dual-diode which comprises a first diode and a second diode, a cathode of the first diode is connected to that of the second diode, an anode of the first diode is connected to the CF_Com signal input terminal of the liquid crystal panel, and the anode of the second diode is connected to the gate of each TFT.

6. A LC photo-alignment panel, comprising a voltage-applying circuit for LC photo-alignment, the voltage-applying circuit comprising:
   a plurality of liquid crystal panels arranged on the LC photo-alignment panel, each liquid crystal panel comprising G_Odd, G_Even, R, G, B, CF_Com, and TFT_Com signal input terminals;
   a plurality of voltage-applying point groups connected to the liquid crystal panels, each voltage-applying point group comprising G_Odd, G_Even, R, G, B, CF_Com, and TFT_Com voltage-applying points respectively connected to the G_Odd, G_Even, R, G, B, CF_Com, and TFT_Com signal input terminals of the corresponding liquid crystal panel;
   a voltage supplying module arranged outside the LC photo-alignment panel and comprising a plurality of power sources each of which is connected to the voltage-applying points of the voltage-applying point groups having the same function; and
   a plurality of switch control circuits arranged on the LC photo-alignment panel, each switch control circuit being connected between each liquid crystal panel and the corresponding voltage-applying point group and being configured for disconnecting the G_Odd, G_Even, R, G, and B signal input terminals of the liquid crystal panel from the G_Odd, G_Even, R, G, and B voltage-applying points of the voltage-applying point group respectively when a current of the CF_Com signal input terminal of one of the liquid crystal panels becomes abnormal.

7. The panel of claim 6, wherein the switch control circuit comprises:
   an ESD protecting circuit for detecting a feedback current from the CF_Com signal input terminal of the liquid crystal panel; and
   a switch circuit for disconnecting the G_Odd, G_Even, R, G, and B signal input terminals of the liquid crystal panel from the G_Odd, G_Even, R, G, and B voltage-applying points respectively when the feedback current is greater than a breakdown current of the ESD protecting circuit.

8. The panel of claim 7, wherein the switch circuit comprises a first switch, a second switch, a third switch, a fourth switch, and a fifth switch;
   one end of the first switch is connected to the G_Odd voltage-applying point, and the other end of the first switch is connected to the G_Odd signal input terminal;
   one end of the second switch is connected to the G_Even voltage-applying point, and the other end of the second switch is connected to the G_Even signal input terminal;

one end of the third switch is connected to the R voltage-applying point, and the other end of the third switch is connected to the R signal input terminal;

one end of the fourth switch is connected to the G voltage-applying point, and the other end of the fourth switch is connected to the G signal input terminal;

one end of the fifth switch is connected to the B voltage-applying point, and the other end of the fifth switch is connected to the B signal input terminal; and control ends of the first switch, the second switch, the third switch, the fourth switch, and the fifth switch are all connected to the ESD protecting circuit.

9. The panel of claim 8, wherein the first switch, the second switch, the third switch, the fourth switch, and the fifth switch are TFT, a source of each TFT is connected to the corresponding power source of the voltage-applying point group, a drain of each TFT is connected to the corresponding signal input terminal of the liquid crystal panel, and a gate of each TFT is connected to the ESD protecting circuit.

10. The panel of claim 9, wherein the ESD protecting circuit is a dual-diode that comprises a first diode and a second diode, a cathode of the first diode is connected to that of the second diode, an anode of the first diode is connected to the CF_Com signal input terminal of the liquid crystal panel, and the anode of the second diode is connected to the gate of each TFT.

11. A LC photo-alignment panel, comprising a voltage-applying circuit for LC photo-alignment, the voltage-applying circuit comprising:
    a plurality of liquid crystal panels each of which comprises G_Odd, G_Even, R, G, B, CF_Com, and TFT_Com signal input terminals;
    a plurality of voltage-applying point groups connected to the liquid crystal panels, each voltage-applying point group comprising G_Odd, G_Even, R, G, B, CF_Com, and TFT_Com voltage-applying points respectively connected to the G_Odd, G_Even, R, G, B, CF_Com, and TFT_Com signal input terminals of the corresponding liquid crystal panel;
    a voltage supplying module comprising a plurality of power sources each of which is connected to voltage-applying points of the voltage-applying point groups having the same function; and
    a plurality of switch control circuits each of which is connected between the liquid crystal panel and the voltage-applying point group and being configured for disconnecting the signal input terminals of G_Odd, G_Even, R, G, and B of the liquid crystal panel from the voltage-applying points of G_Odd, G_Even, R, G, and B of the voltage-applying point group when current of the CF_Com signal input terminal of a liquid crystal panel becomes abnormal.

12. The panel of claim 11, wherein the switch control circuit comprises:
    an ESD protecting circuit for detecting a feedback current from the CF_Com signal input terminal of the liquid crystal panel; and
    a switch circuit for disconnecting the G_Odd, G_Even, R, G, and B signal input terminals of the liquid crystal panel from the G_Odd, G_Even, R, G, and B voltage-applying points respectively when the feedback current is greater than a breakdown current of the ESD protecting circuit.

13. The panel of claim 12, wherein the switch circuit comprises a first switch, a second switch, a third switch, a fourth switch, and a fifth switch;
    one end of the first switch is connected to the G_Odd voltage-applying point, and the other end of the first switch is connected to the G_Odd signal input terminal;
    one end of the second switch is connected to the G_Even voltage-applying point, and the other end of the second switch is connected to the G_Even signal input terminal;
    one end of the third switch is connected to the R voltage-applying point, and the other end of the third switch is connected to the R signal input terminal;
    one end of the fourth switch is connected to the G voltage-applying point, and the other end of the fourth switch is connected to the G signal input terminal;
    one end of the fifth switch is connected to the B voltage-applying point, and the other end of the fifth switch is connected to the B signal input terminal; and
    control ends of the first switch, the second switch, the third switch, the fourth switch, and the fifth switch are all connected to the ESD protecting circuit.

14. The panel of claim 13, wherein the first switch, the second switch, the third switch, the fourth switch, and the fifth switch are all TFTs, a source of each TFT are respectively connected to the corresponding power source of the voltage-applying point group, a drain each TFT is connected to the corresponding signal input terminal of the liquid crystal panel, and a gate of each TFT is connected to the ESD protecting circuit.

15. The panel of claim 14, wherein the ESD protecting circuit is a dual-diode that comprises a first diode and a second diode, a cathode of the first diode is connected to that of the second diode, an anode of the first diode is connected to the CF_Com signal input terminal of the liquid crystal panel, and the anode of the second diode is connected to the gate of each TFT.

\* \* \* \* \*